United States Patent [19]

Moon et al.

[11] 3,919,479

[45] Nov. 11, 1975

[54] BROADCAST SIGNAL IDENTIFICATION SYSTEM

[75] Inventors: Warren D. Moon, Walpole; Richard J. Weiner, Norwood; Robert A. Hansen, Burlington; Robert N. Linde, Marion, all of Mass.

[73] Assignee: The First National Bank of Boston, Boston, Mass.

[22] Filed: Apr. 8, 1974

[21] Appl. No.: 458,978

Related U.S. Application Data

[63] Continuation of Ser. No. 290,835, Sept. 21, 1972, abandoned.

[52] U.S. Cl. .................. 179/1 SB

[51] Int. Cl.$^{2}$ .................. G10L 1/02

[58] Field of Search .............. 343/100 CL; 235/181; 179/1 SA, 1 SB

[56] References Cited

UNITED STATES PATENTS

| | | | |
|---|---|---|---|
| 2,643,819 | 6/1953 | Lee et al. | 235/181 R |
| 3,466,394 | 9/1969 | French | 179/1 SB |
| 3,646,334 | 2/1972 | Wold | 235/181 |
| 3,700,815 | 10/1972 | Doddington et al. | 179/1 SA |

OTHER PUBLICATIONS

Lee and Wiener, "Correlation Functions and Communications Applications," Electronics, June 1950.

*Primary Examiner*—Kathleen H. Claffy
*Assistant Examiner*—E. S. Kemeny
*Attorney, Agent, or Firm*—Robert F. O'Connell

[57] ABSTRACT

A process for automatic electronic recognition and identification of programs and commercial advertisements broadcast on television and radio wherein a digitally sampled reference signal segment derived from either the audio or video portion of the original program content to be identified is compared with successive digitally sampled segments of the corresponding audio or video portion of a broadcast signal in a correlation process to produce a correlation function signal. The sampling rates and the time duration of the reference signal segment and the broadcast signal segments are the same. When the signal segments which are compared are the same, the correlation function signal is relatively large and a recognition thereof is achieved when such correlation function signal exceeds a selected threshold level. The compared signal segments may also be obtained as low frequency signals derived from the original reference and broadcast signals by non-linear and envelope formation processing techniques.

14 Claims, 4 Drawing Figures

BROADCAST SIGNAL IDENTIFICATION SYSTEM

This is a continuation of application Ser. No. 290,835, filed on Sept. 21, 1972, now abandoned.

DISCLOSURE OF THE INVENTION

INTRODUCTION

This invention relates generally to the identification of broadcast signals, such as television or radio broadcast signals, and, more particularly, to the detection, identification and logging of prerecorded portions of broadcast signals having a specialized program content, such as commercial advertisements.

BACKGROUND OF THE INVENTION

A large number of commercial advertisements representing a huge investment in time, money and effort are broadcast every day on television and radio stations throughout the country. In order to confirm that an advertiser's sales messages are reaching their desired and contemplated television or radio audiences at the correct times as selected by the advertisers and broadcast personnel connected therewith, it is necessary that the signals which are broadcast be appropriately reviewed and tabulated to provide adequate verification for both the broadcaster and advertisers that the stations carrying the commercial messages are broadcasting the messages as contracted and that such broadcasts occur at the agreed upon times during the broadcasting schedule. Accordingly, it is desirable that a convenient and economically feasible service be available for reviewing a large number of broadcasts to record such proof of performance to verify for an advertiser, for example, the broadcast of his own sales messages. In addition, such a service could provide information which would assist the broadcaster in his accounting and billing procedures related thereto as well as provide information to the advertisers on the extent and nature of broadcast advertising by their competitors. Moreover, such a service could further provide sufficient information to determine potential payments to actors and actresses appearing in commercial advertisements, or other special program material, so that such payments are properly allocated under particular residual payment schemes which are utilized in the broadcast indutry.

For such a service to be economically effective, it should provide substantially automatic review and tabulation of the broadcasts of an extremely large number of stations in a prompt and efficient manner at reasonable cost so that effective use can be made thereof for a large number of different subscribers.

DISCUSSION OF THE PRIOR ART

Although the design of substantially fully automatic systems for electronic reviewing and tabulating the content of broadcast signals for the above purposes has been attempted, no system has been successfully implemented at the present time in the broadcast industry and none has yet proved fully acceptable for use by all segments of the industry as well as by appropriate government regulatory agencies, such as the Federal Communications Commission in the United States, for example. Accordingly, such review and tabulation up to this time has, in effect, been performed manually through the use of a large number of persons, each of which selectively monitors a particular television or radio broadcasting station and notes in a suitable log, for example, the date, time and other identifying information with respect to each commercial advertisement. The results thereof can then be summarized in one or more suitable reports supplied on a periodic basis to interested subscribers. Such review and tabulation is relatively inefficient since it is virtually economically impossible to monitor every broadcast throughout an entire broadcast day on a large number of different television and radio stations throughout the country, and then to provide a rapid and complete collection of reports thereon in a reasonably effective manner.

To date, the only techniques that have been used in attempts to provide such a service using substantially automatic electronic equipment have required the use of coded identifying signals inserted at appropriate times in each selected commercial advertisement at the time such program is recorded for subsequent broadcast. Thus, a selected part of the audio and/or video signals comprising each commercial advertisement must be set aside for the insertion of different coded information for each program content which is to be tabulated. The electronic equipment must then also include appropriate decoding means for receiving and decoding each of the various coded signals which have been so broadcast to correctly identify the commercial advertisement involved.

While large sums of money have been invested in an attempt to provide a workable system utilizing such coded signal techniques, this approach has been hampered not only by technical and legal difficulties, but also by opposition from various sources within and associated with the broadcast industry. For example, in the use of coded signal techniques, the required alteration of a portion of the signal which is broadcast requires appropriate review and approval not only by members of the broadcast industry but also, in the United States, by regulatory government agencies, such as the Federal Communication Commission, which agency up to now has been relatively cautious in not approving anything but the most minimal alteration of broadcast signals in this manner without relatively widespread acceptance thereof by those in the broadcast industry. Protests concerning the need for such signal alteration have been voiced on the basis that the allocation of portions of the broadcast signal band for these purposes is unwarranted in view of the many other needs for bandwidth allocation which it is believed should have priority over the use of codes for such program monitoring. Further, special additional work must be performed by those who initially record the program portions to be monitored and such special techniques, as required for the necessary coding and decoding process, tend to make the use of such coded systems technically impractical and economically undesirable.

DESCRIPTION OF THE INVENTION

This invention utilizes a process for completely automatic electronic detection and identification of recorded commercial advertisements, or other specialized program content, in television or radio broadcasts. The addition of codes or other alterations to the broadcast material is completely unnecessary. In accordance with the invention a pattern recognition technique is utilized which technique permits an audio or a video signal which constitutes the program or commercial advertisement which is to be identified to effectively act as its own code. That is, a segment of the audio signal, for example, of each program or commercial advertisement which it is desired to recognize is stored in a suitable memory storage device to form a unique set of stored waveform patterns (i.e., in effect, a set of fingerprints or signatures, one for each of the commercial advertisements that are involved) against which all future monitored broadcast information is compared. This technical approach, therefore, in no way involves regulating agencies such as the FCC or special work by those who initially record the programs or commercials, since no alteration of the signal which is broadcast is in any way involved. Although the approach of the invention as discussed in detail herein utilizes the audio signal for the purpose of recognizing the occurrence of a program or a commercial advertisement, the invention could also utilize the video signal instead of, or in addition to, the audio signal.

The pattern recognition technique used in the process of this invention is a mathematical waveform manipulation known as correlation. Correlation theory, per se, is described in the literature, as, for example, in Y. W. Lee, *Statistical Theory of Communications*, John Wiley & Sons, New York, 1967; N. A. Anstey, "Correlation Techniques — A Review," *Journal of the Canadian Society of Exploration Geophysicists*, Vol. 2, No. 1, December 1966; and J. R. Klauder et al., "The Theory and Design of Chirp Radars," *The Bell System Technical Journal*, Vol. 39, No. 4, July 1960. Accordingly, the use herein of the term "correlating" is intended to mean the mathematical operation of correlation as described in such literature, the theory thereof not requiring any further detailed description herein. The application of correlation techniques to the problem of detecting and identifying commercial advertisements on television and radio, however, is unique and has not been practiced or even suggested prior to this invention, even though there has been a well documented need for the aforementioned automatic electronic detection and identification systems for many years. This unique application of the mathematical correlation process to the specific task of detecting and identifying recorded commercial advertisements represents, therefore, the primary crux of the invention.

In brief, correlation is a mathematical means of measuring how well two waveforms compare. If one of the two waveforms is of finite length and is permanently stored in an appropriate memory storage device, a running comparison of the finite stored waveform against a second continuous waveform may be accomplished through on-line solution of the correlation integral equation to produce a third waveform known as the correlation function. When the continuous waveform contains a signal segment (which may even be obscured by noise) which matches the stored waveform, the correlation function attains a large value. The sensing of this large value constitutes a recognition, and is the process by which the occurrence of a commercial advertisement is recognized in the process of the invention.

The method described above in its simplest form is generally satisfactory so long as the broadcast stations use video tape, audio tape or film systems which maintain the same linear speeds during the actual broadcast as that utilized when the reference signal segment was initially formed and stored. However, because a particular commercial advertisement is often broadcast by many different broadcasting stations at many different times, the recorded signal may be subject to slight tape speed variations from broadcast to broadcast, due, for example, to the presence of "wow" and "flutter" in the tape transport systems which are used. Such tape speed variations have the effect of either compressing or expanding the signal waveform which is being broadcast so as to cause it to appear somewhat dissimilar to the stored reference. If the tape speed variations are sufficiently large, this phenomenon may even prevent the desired recognition of the reference signal pattern which is contained in the broadcast signal.

In an important embodiment of the process of the invention, the above problem is overcome in a manner which greatly reduces the sensitivity of the pattern recognition process to tape speed variations as is discussed below. Such embodiment utilizes the basic correlation technique already discussed with respect to the broad concept of the invention, but further includes the use of low, sub-audio frequency information which is derived from the broadcast signal for purposes of the pattern recognition process.

To understand briefly the latter embodiment, it is useful to regard the audio signal as a carrier which has been effectively amplitude modulated by very low frequencies corresponding to syllabic rates of spoken words, to the rates at which notes are played in music, and so forth. The process in this embodiment of the invention uses a non-linear processing and envelope signal formation scheme in order to extract energy at the lower frequencies described above. Specifically, the effective audio carrier of the reference and broadcast signals can be appropriately processed in a non-linear manner to produce signals from which envelope signals are obtained, the envelope signals being digitized and appropriately compared by a correlation process, as discussed above. Extensive empirical work has conclusively shown that recognition results, particularly when using envelope signals having sub-audio signal components, are far less sensitive to tape or film projector speed variations than those obtained using the raw audio signal itself.

As discussed in more detail below, an additional extremely important and valuable advantage of using the low frequency, or sub-audio, information mentioned above is that an enormous speed-up in the rate of processing recognition information in a central processing unit relative to real-time rates is possible, providing an advantageous economic impact on the value of such a system. Without the possibility of such effective processing speed-up, the processing of data from many hundreds of broadcasting stations might possibly require processing capacity so large as to make the system economically infeasible in the event that large amounts of recognition processing are to be accomplished.

In addition to the recognition of particular commercial advertisements, a total automatic system is also required to determine and record additional information such as the city and broadcasting station involved, the time and date of such recognition, and other such appropriate information which can be suitably recorded, as on a magnetic tape, for subsequent use as input information to a data processor. The data processor, in turn, can then process large volumes of such information leading to appropriate reports or other services to subscribing clients.

The automatic electronic process for detecting and identifying commercial advertisements as described above is the only approach known at this time which does not require the addition of a code or other alteration to the broadcast signal. There are a number of possible approaches to the design of equipment to implement the method of the invention. For example, the recognition and logging of occurrences could be accomplished in real-time at on-site locations near the broadcasting stations which are monitored. Alternatively, information could be recorded at on-site locations and later processed at a central processing station for purposes of recognizing the occurrences. In any case, it is possible to monitor each of hundreds of broadcasting stations for thousands of programs or commercials. More detailed descriptions of appropriate embodiments of the above-described invention are discussed below with reference to the accompanying drawing wherein FIG. 1 shows a block diagram illustrating the steps of the process of the invention;

Figure 1:
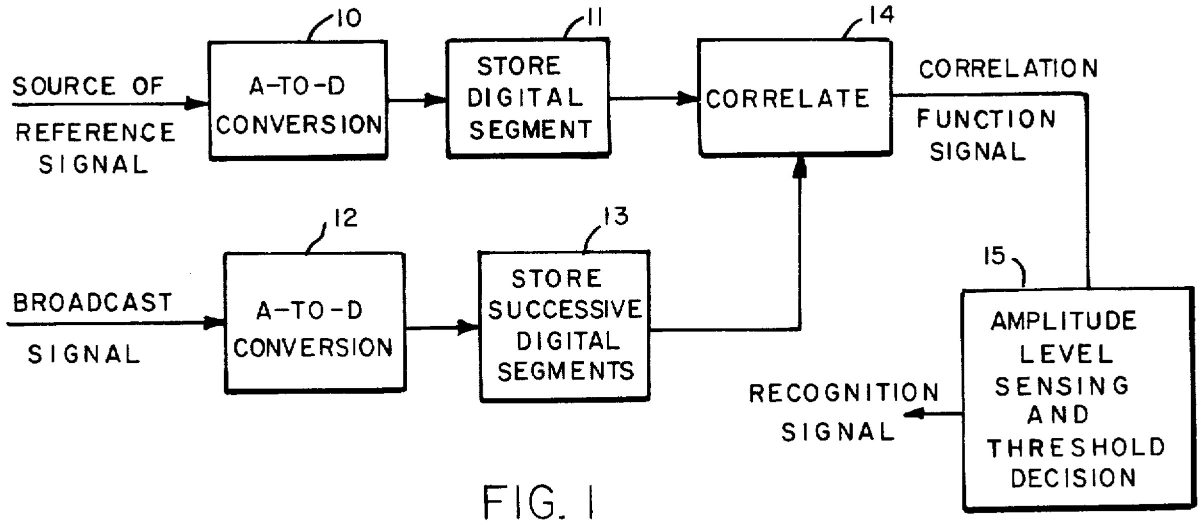

FIG. 1 shows in broad diagrammatic form the process of the invention for providing a codeless signal identification technique for detecting and identifying the presence of a particular program content in television or radio broadcast signals. As can be seen therein, a source for the reference signal is utilized which reference signal is a replica of the signal which is to be later recognized. The source reference signal input, for example, may be a recorded commercial advertisement, or the like, which has a fixed time duration anywhere from a few seconds to a minute or more. In the embodiment described, such signal input is an audio signal, for example, and is converted to digital form by an appropriate A-to-D conversion process 10 in a well-known manner.

Figure 2:
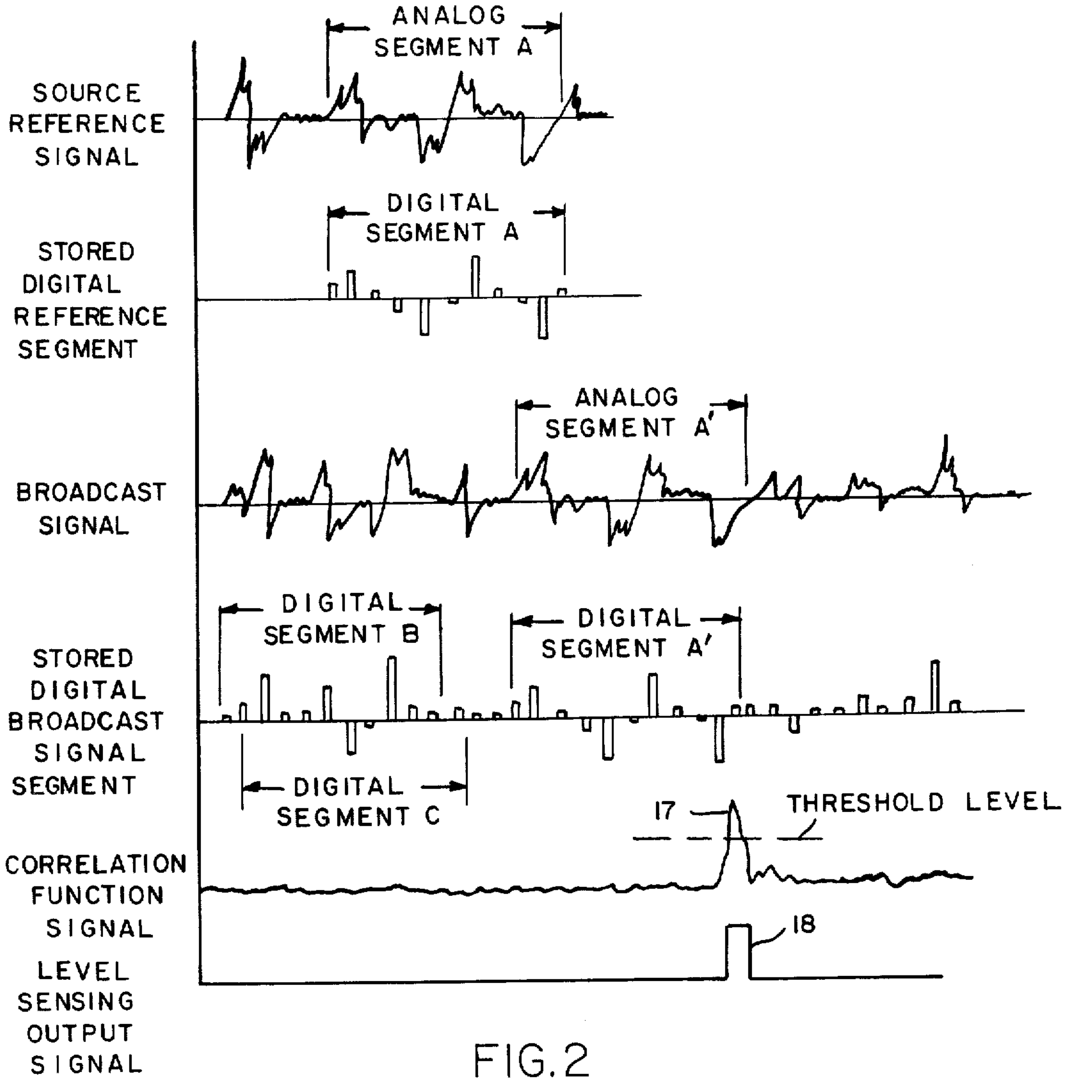
FIG. 2 depicts various waveforms associated with the block diagram of FIG. 1.

A selected segment of the digitized source reference signal, such as Segment A in FIG. 2, is thereupon stored in an appropriate memory storage device as, for example, a digital storage shift register as shown by block 11. The selected segment will be a portion of the input signal having a suitably chosen time duration, e.g., in one satisfactory embodiment the time duration for the selected segment was chosen as eight seconds. The time duration is selected to be sufficiently long so as to provide a unique segment sample of the source signal. By the term "unique" it is meant that the probability that the waveform characteristics of a selected sample signal segment of a broadcast signal has the same waveform characteristics as those of any other sample signal segment of any other broadcast signal having the same time duration is essentially zero.

With the reference signal segment appropriately stored for ultimate use in aa digital signal comparison process, it is now possible, in accordance with the process of the invention, to recognize the presence in a broadcast signal of the particular program content from which the reference signal segment has been taken. Thus, a broadcast signal which, for example, represents a continuous signal as broadcast by a particular television or radio station, is obtained for processing as shown in FIG. 1. Such signal, for example, can be appropriately stored on magnetic tape as it is being broadcast for subsequent processing or it may be processed in real time as the broadcase is actually made.

In the signal recognition process, the broadcast signal is first converted from analog to digital form through an appropriate analog-to-digital conversion process as shown by block 12 in FIG. 1. Digitized segments of the broadcast signal, each having the same time duration as the stored reference signal segment, are successively stored in an appropriate storage device, such as a digital shift register, as shown by block 13.

The stored reference digital signal segment A as shown in FIG. 2 is then continuously compared with each successive signal segment of the broadcast signal in the correlation step shown by block 14. Thus, for example, a digital segment B is compared with reference digital segment A in the correlation process. Because the waveform characteristics of the compared segments differ, the correlation function signal obtained from the correlation process is essentially small, or effectively zero. The next successive signal segment of the monitored broadcast signal, i.e., signal segment C in FIG. 2, is then compared with reference signal A and the correlation process again yields a correlation function of essentially zero. Thereupon, each successive signal segment of the monitored broadcast signal is compared with reference signal A until digital signal segment A' is compared. The latter signal segment represents the portion of the broadcast signal which is the same as that portion of the reference signal which was originally stored as the reference signal segment A and, accordingly, it has the same waveform, both in analog and digital form, as that of the reference signal segment. When segment A is compared with segment A', the amplitude of the correlation function signal becomes relatively large as shown by the large amplitude portion 17 of the correlation function signal of FIG. 2.

The presence of such a large amplitude pulse-like portion indicates that a recognition has been made and that the broadcast signal contains the program content from which the reference signal segment was originally taken. The amplitude level of the correlation function signal is continuously sensed so that a recognition signal in the form of a pulse 18 of fixed amplitude and duration is provided when the correlation function signal amplitude exceeds a predetermined threshold level, as shown by the amplitude level sensing and threshold decision block 15 in FIG. 2. Thus, the recognition signal 18 is present only when a recognition of the identity between a monitored broadcast signal segment and the reference signal segment is recognized by the correlation process, each such recognition signal thereby providing an indication of such presence for use as desired. Thus, the recognition signal may be used to actuate various recording devices for tabulating the date and time of the recognition with reference to the broadcast schedule of the particular broadcast being monitored, the call letters of the station and the city from which the broadcast emanated. Procedures for such utilization of the recognition signal are well known in the art and can be set up in accordance with the needs of the users of the system. Other processing of the information can be performed by an appropriate data processing means for providing tabulations and reports of the program performances to various subscribers who make use of the system.

As discussed above, the system shown and described with reference to FIGS. 1 and 2 is generally satisfactory so long as the broadcast signal is being broadcast by a station using a video or audio tape system which provides substantially the same linear tape speed as that utilized when the reference signal segment was initially formed. However, because a particular program content, such as a commercial advertisement, for example, may be broadcast by various broadcasting stations at various times either on the same day or over a more prolonged period of time, the video or audio taped broadcast signal may be subject to slight tape speed variations due to the presence of different characteristics, such as wow and flutter, in the different tape transport systems which are used or in the same tape transport system as used at different times. Such tape speed variations have the effect of either slowing down or speeding up (i.e., compressing or expanding) the waveform which is being broadcast and, hence, produce corresponding changes in the waveform characteristics of the sampled signal segments which are being compared to the fixed reference signal segment. If the tape speed variations are sufficiently large such compression or expansion effects may prevent the desired recognition of the signal pattern which is contained in the broadcast signal.

In order to overcome any problems which may arise in some applications of the process of the invention, as when tape speed variations are sufficiently severe, for example, a preferred embodiment of the process of the invention includes a process for treating the reference and broadcast signals involved in a manner which reduces the sensitivity of the comparison process to tape speed variations.

Broadly, such a process utilizes the basic correlation comparison techniques described above and further includes the formation of envelope signals having substantially low, and preferably sub-audio, frequency signal components derived from the reference and monitored broadcast signals, which envelope signals are used in the comparison process. To understand such a process it is helpful to consider the audio, or video, signals involved as including a carrier signal which is amplitude modulated by very low frequencies corresponding to syllabic frequency rates. These low modulating frequencies are well under 100 Hz. and are concentrated at frequencies below 30 Hz. The process for utilizing such low frequency signal components derived from the higher frequency audio or video signals can be best described with the help of FIGS. 3 and 4, the former figure showing a block diagram effectively depicting the steps involved in such process and the latter figure showing various waveforms present in the process of FIG. 4. Accordingly, in the system suggested therein the source reference signal 25 as seen in FIG. 4 is first processed in a non-linear manner, as shown by block 26 of FIG. 3, to produce a non-linear signal. A number of appropriate non-linear processing schemes can be used for this purpose, including rectifying the signal by the use of either full-wave or half-wave rectification, squaring the signal, applying a longarithmic operation to the signal, and the like. FIG. 4, for example, depicts a non-linear signal 27 which results from a full-wave rectification of the source reference signal 25.

Figure 3:
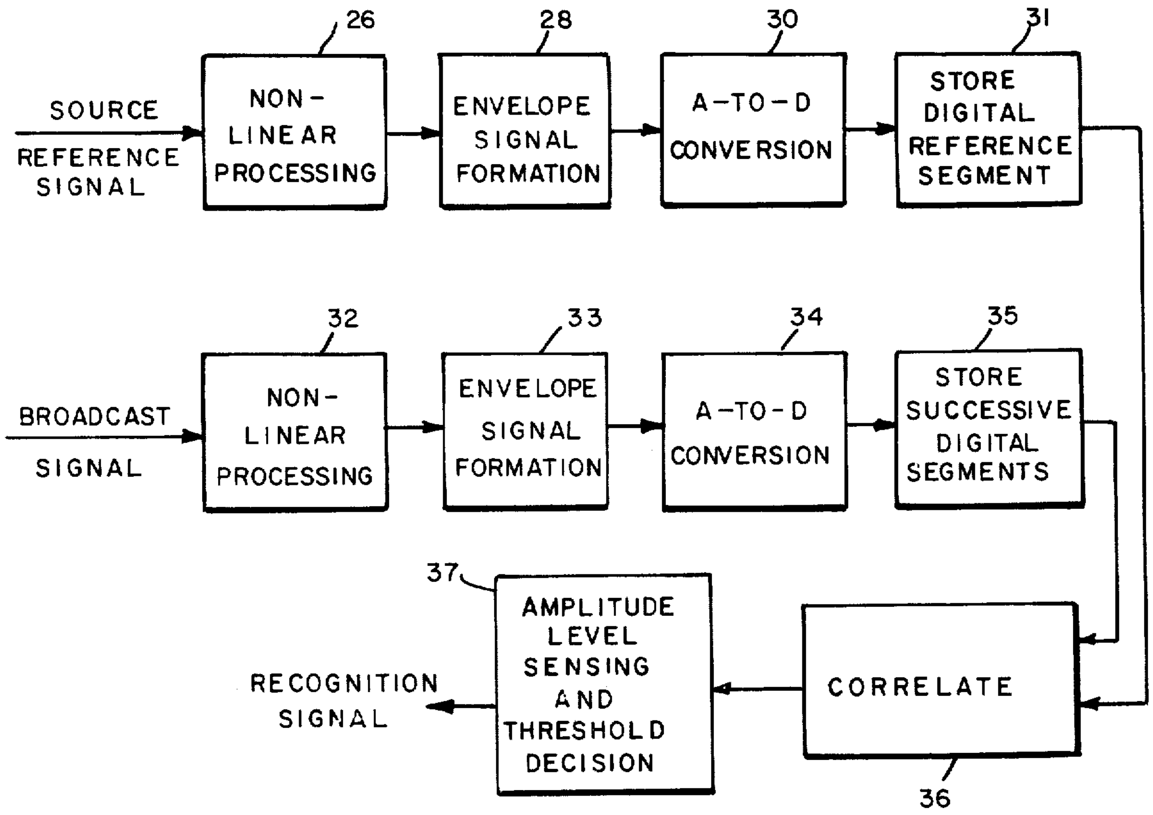
FIG. 3 shows a block diagram illustrating the steps of an alternative embodiment of the invention.
Figure 4:
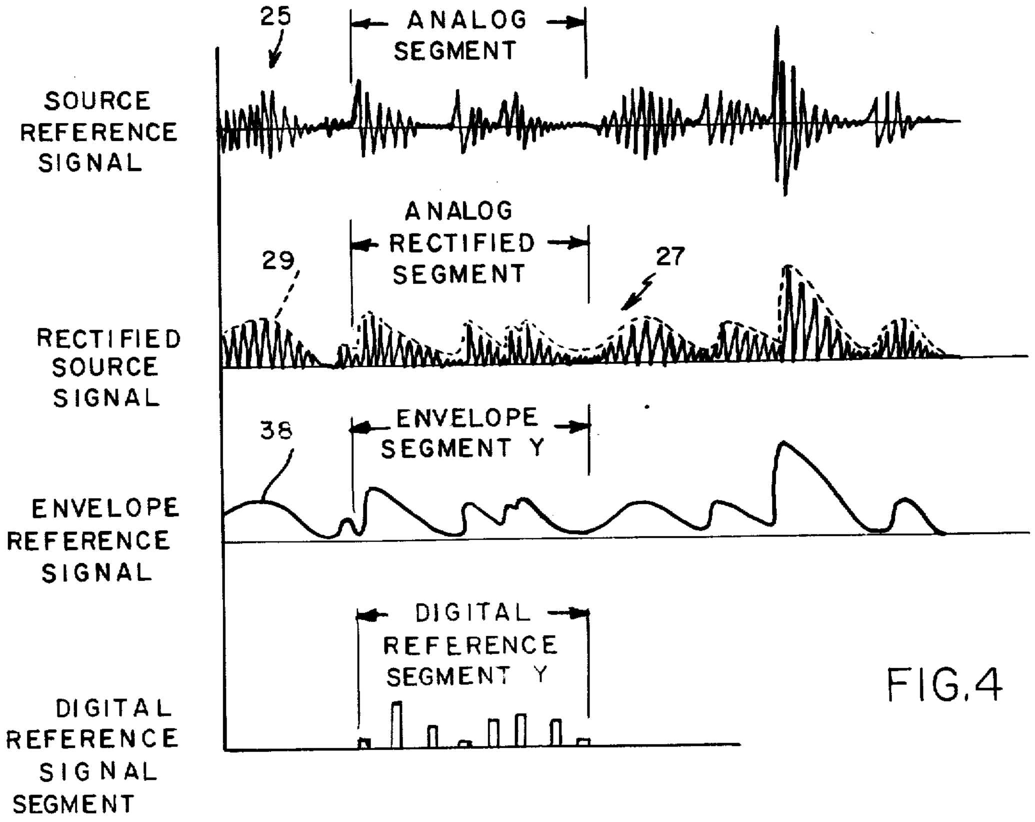
FIG. 4 depicts various waveforms associated with the block diagram of FIG. 3.

An envelope signal which in the preferred embodiment shown effectively represents the envelope of the non-linear signal 27 is then formed as shown by block 28 of FIG. 3. Such an envelope waveform can be generated through the use of an appropriate peak detection process or by the use of low-pass filtering, or by other suitable processes to produce the desired low frequency envelope signal, or waveform, shown by the dashed line waveform 29 and by the solid line envelope reference signal 38 in FIG. 4. The envelope reference signal so produced has relatively low frequency components, generally less than 100 Hz, for the most part, and most heavily concentrated below 30 Hz. The envelope reference signal is then converted from analog to digital form by an A-to-D conversion process as shown by block 30 of FIG. 3 by being appropriately digitally sampled at a selected sampling rate and over a selected time duration in the same manner as the A-to-D conversion process discussed in connection with the description of the system shown in FIGS. 1 and 2. In this case the envelope reference signal segment "Y" of the envelope signal can be sampled at a very much lower sampling rate than the reference signal segment A formed in the raw audio signal in FIG. 2. It should be noted that the digitally sampled reference signal segment in this instance does not represent the audio signal which is prepared for broadcast but merely represents a signal derived therefrom, through the non-linear and envelope processing, which reference signal segment effectively contains the syllabic frequency components of the audio signal, as described above.

The digitally sampled envelope reference signal segment is then stored in a storage device, such as a digital shift register, as in the previously discussed process of FIG. 1 and as shown by block 31 of FIG. 3. The monitored broadcast signal is similarly processed by appropriate non-linear processing and envelope formation techniques and the envelope signal appropriately digitally sampled and stored in the form of successive signal sample segments of the envelope signal derived from the monitored broadcast signal, as shown by blocks 32, 33, 34 and 35 of FIG. 3. The stored reference signal segment is then compared in a correlation process with the successive monitored signal segments and the level of the correlation function signal appropriately sensed to produce the desired recognition signal as shown by blocks 36 and 37 in FIG. 3 in a manner similar to that discussed with reference to FIGS. 1 and 2. It has been found that when an envelope signal, particularly when such signal has syllabic, or low frequency, components, is obtained from the original reference program content and from the monitored broadcast signal for correlation purposes, the digitally sampled waveforms of sampled signal segments which are to be compared, are much less sensitive to tape speed and other channel transfer function variations which produce an effective compression or expansion of the audio signal which is being broadcast. Thus, even were such variations to occur, the digitally sampled signal segments which are to be compared in the correlation process of the invention remain effectively unchanged so that more certain recognition thereof occurs than if the original audio signal is used in the correlation process.

As mentioned above, an additional important advantage in using the envelope signal concept lies in the improvement in data processing speed which can be achieved in processing the broadcast signals. Thus, if a central processing unit is used to correlate that data which has been previously sampled and recorded, for example, there is always a maximum rate at which the digital information can be entered into the correlation processing unit for comparison. Thus, the more slowly one digitally samples the signals which are to be compared, the greater is the speed-up factor which can be obtained in going from the real-time signal sampling rates to the processing rates. For example, if the audio signal from a broadcast station can be digitally sampled at 50 Hz and a processor can accept and process such data at 10,000 Hz, then every 10,000 hours of broadcast time can be processed by a central processing unit in 50 hours. The lower the digital sampling rate that can be used in the sampling process the larger the number of broadcast hours which can be processed in any specified time duration by the central processing station. Accordingly, the use of an envelope signal containing low frequency components, particularly in the sub-audio range as discussed above, permits the use of very low digital sampling rates which would not be possible if the raw audio signal itself were to be used. An enormous speed-up in the processing rates relative to the real-time rates at which said sampling occurs in thereby possible. Without the capability for obtaining such a speed-up in the processing time, the processing of data from many hundreds of broadcasting stations might possibly require a processing capacity so large as to make the economic use of the signal identification system infeasible. However, the high ratio of processing rate to sampling rate makes the processing of data from several hundred broadcasting stations economically sound and, therefore, the system becomes effective in use for the broadcast industry.

What is claimed is:

1. A process for automatic electronic recognition and identification of programs and commercial advertisements broadcast on television and radio, said process comprising the steps of processing a reference signal which constitutes the program or commercial advertisement to be identified to produce a processed reference signal having frequency components in the sub-audio frequency range corresponding to the syllabic frequency rates of the information content of said signal to be identified;

generating a digitally sampled reference signal segment having a selected sampling rate and time duration, said reference signal segment representing at least a part of said processed referenced signal;

processing a broadcast signal in the same manner as said reference signal so as to produce a processed broadcast signal having frequency components in the sub-audio frequency range corresponding to the syllabic frequency rates of the information content of said broadcast signal;

generating a plurality of successive digitally sampled broadcast signal segments, each said digitally sampled broadcast signal segment having the same sampling rate and time duration as the selected sampling rate and time duration of said reference signal segment;

correlating each successive broadcast signal segment with said reference signal segment to produce a correlation function signal which has a relatively small amplitude level when said correlated signal segments are different and a relatively large amplitude level when said correlated signal segments are the same; and sensing the amplitude level of said correlation function signal to provide a recognition signal when the amplitude of said correlation function signal exceeds a selected threshold level to identify the presence of said program or commercial advertisement in said broadcast signal.

2. A process in accordance with claim 1 wherein said correlation process includes the steps of storing a digitally sampled reference signal segment in a first storage device;

storing each of said plurality of digitally sampled broadcast signal segments successively in a second storage device;

successively correlating said stored reference signal segment with each said stored broadcast signal segment to produce said correlation function signal.

3. A process in accordance with claim 2 wherein said reference and broadcast signals are originally in analog form and further wherein said processed reference signal and said processed broadcast signal are derived from the audio signal portions of said reference and broadcast signals.

4. A process for automatic electronic recognition and identification of programs and commercial advertisements broadcast on television and radio, said process comprising the steps of processing a reference signal which constitutes the program or commercial advertisement to be identified in a non-linear manner to produce a non-linear signal;

forming an envelope of said non-linear signal to produce an envelope reference signal;

generating a digitally sampled envelope reference signal segment having a selected sampling rate and time duration, said envelope reference signal segment representing at least a part of said envelope reference signal;

processing a broadcast signal in the same non-linear manner as said reference signal to produce a non-linear signal;

forming an envelope of said non-linear signal to produce an envelope broadcast signal;

generating a plurality of successive digitally sampled envelope broadcast signal segments each having the same sampling rate and time duration as the selected sampling rate and time duration of said envelope reference signal segment;

correlating each successive envelope broadcast signal segment with said envelope reference signal segment to produce a correlation function signal which has a relatively small amplitude level when said correlated signal segments are different and a relatively large amplitude level when said correlated signal segments are the same;

sensing the amplitude level of said correlation function signal to provide a recognition signal when the amplitude of said correlation function signal exceeds a selected threshold level to identify the presence of said program or commercial advertisement in said broadcast signal.

5. A process in accordance with claim 4 wherein said correlation process includes storing said digitally sampled envelope reference signal segment in a first storage device;

storing each of said digitally sampled envelope broadcast signal segments successively in a second storage device; and successively correlating said stored envelope reference signal segment with each of said stored envelope broadcast signal segments to produce said correlation function signal.

6. A process in accordance with claim 4 wherein said non-linear processing of said reference signal and said broadcast signal includes rectifying said reference signal and said broadcast signal, respectively.

7. A process in accordance with claim 6 wherein said rectification is a full-wave rectification.

8. A process in accordance with claim 6 wherein said rectification is a half-wave rectification.

9. A process in accordance with claim 4 wherein said non-linear processing of said reference signal and said broadcast signal includes squaring the amplitudes of said reference signal and said broadcast signal, respectively.

10. A process in accordance with claim 4 wherein the envelope signals of said non-linearly processed reference signal and said non-linearly processed broadcast signal are formed by a peak detection process.

11. A process in accordance with claim 4 wherein the envelope signals of said non-linearly processed reference signal and said non-linearly processed broadcast signal are formed by a low-pass filtering process.

12. A process in accordance with claim 4 wherein the frequency components of said envelope reference signal and said envelope broadcast signal are generally below 100 Hz.

13. A process in accordance with claim 5 wherein said envelope reference and envelope broadcast signals are in analog form and further wherein said envelope reference signal segment and said envelope broadcast signal segments are derived from the audio signal portions of said reference and broadcast signals.

14. A process in accordance with claim 5 wherein said envelope reference and envelope broadcast signals are in analog form and further wherein said envelope reference signal segment and said envelope broadcast signal segments are derived from the video signal portions of said reference and broadcast signals.

* * * * *